US009755905B2

(12) United States Patent
Luo et al.

(10) Patent No.: US 9,755,905 B2
(45) Date of Patent: *Sep. 5, 2017

(54) METHOD, NODE DEVICE AND SYSTEM FOR ESTABLISHING LABEL SWITCHED PATH

(71) Applicant: Huawei Technologies Co., Ltd., Shenzhen (CN)

(72) Inventors: Yanxing Luo, Chengdu (CN); Hao Long, Chengdu (CN); Min Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,613

(22) Filed: Feb. 8, 2016

(65) Prior Publication Data
US 2016/0156521 A1 Jun. 2, 2016

Related U.S. Application Data

(63) Continuation of application No. 13/967,016, filed on Aug. 14, 2013, now Pat. No. 9,258,189, which is a (Continued)

(30) Foreign Application Priority Data

Feb. 17, 2011 (CN) .......................... 2011 1 0039536

(51) Int. Cl.
*H04L 12/24* (2006.01)
*H04L 12/723* (2013.01)
(Continued)

(52) U.S. Cl.
CPC .......... *H04L 41/0896* (2013.01); *H04L 41/12* (2013.01); *H04L 45/507* (2013.01); *H04L 47/724* (2013.01); *H04L 47/825* (2013.01)

(58) Field of Classification Search
None
See application file for complete search history.

(56) References Cited

U.S. PATENT DOCUMENTS 6,895,441 B1 * 5/2005 Shabtay ................. H04L 45/00
340/2.1
7,567,512 B1 7/2009 Minei et al.
(Continued)

FOREIGN PATENT DOCUMENTS

CN 101043432 A 9/2007
CN 101136844 A 3/2008
(Continued)

OTHER PUBLICATIONS

Awduche et al., "RSVP-TE: Extensions to RSVP for LSP Tunnels," memo, Network Working Group, The Internet Society (Dec. 2001).
(Continued)

*Primary Examiner* — Hicham Foud
(74) *Attorney, Agent, or Firm* — Leydig, Voit & Mayer, Ltd.

(57) ABSTRACT

Embodiments of the disclosure provide a method for advertising link bandwidth information. The method comprises sending a link state advertisement (LSA) message, which comprises bandwidth information of a link, to a plurality of network nodes in a network. The bandwidth information comprises a plurality of link bandwidths and availabilities corresponding to the plurality of link bandwidths respectively. Each availability is a time scale that the corresponding link bandwidth is ensured.

7 Claims, 6 Drawing Sheets

Related U.S. Application Data continuation of application No. PCT/CN2012/071055, filed on Feb. 13, 2012.

(51) Int. Cl.
*H04L 12/913* (2013.01)
*H04L 12/911* (2013.01)

(56) References Cited

U.S. PATENT DOCUMENTS

| | | | |
|---|---|---|---|
| 7,903,554 B1* | 3/2011 | Manur | H04L 45/026 370/230.1 |
| 2003/0039206 A1* | 2/2003 | Dang | H04L 41/12 370/215 |
| 2003/0108029 A1* | 6/2003 | Behzadi | H04L 12/437 370/351 |
| 2003/0185217 A1* | 10/2003 | Ganti | H04L 12/64 370/395.5 |
| 2004/0143655 A1 | 7/2004 | Narad et al. | |
| 2005/0030951 A1 | 2/2005 | Maciocco et al. | |
| 2005/0188100 A1* | 8/2005 | Le Roux | H04L 12/5695 709/238 |
| 2006/0034171 A1 | 2/2006 | Rajsic et al. | |
| 2006/0117110 A1* | 6/2006 | Vasseur | H04L 45/00 709/232 |
| 2006/0182119 A1* | 8/2006 | Li | H04L 12/5695 370/395.52 |
| 2007/0076599 A1* | 4/2007 | Ayyagari | H04L 9/00 370/229 |
| 2008/0130627 A1* | 6/2008 | Chen | H04L 45/02 370/351 |
| 2009/0086633 A1 | 4/2009 | Hu et al. | |
| 2009/0201932 A1* | 8/2009 | Kumar | H04L 12/5695 370/395.5 |
| 2010/0214913 A1* | 8/2010 | Kompella | H04L 12/5695 370/230 |
| 2012/0170461 A1* | 7/2012 | Long | H04L 45/50 370/235 |
| 2012/0207012 A1* | 8/2012 | Kompella | H04L 12/5695 370/216 |
| 2012/0230196 A1* | 9/2012 | Jain | H04L 47/724 370/235 |
| 2013/0329602 A1 | 12/2013 | Luo et al. | |

FOREIGN PATENT DOCUMENTS

| | | |
|---|---|---|
| CN | 101345714 A | 1/2009 |
| CN | 101945048 A | 1/2011 |
| CN | 102143066 A | 8/2011 |
| EP | 0830775 B1 | 8/2002 |
| EP | 1921813 A2 | 5/2008 |
| EP | 1993261 A1 | 11/2008 |
| EP | 2224649 A1 | 9/2010 |
| RU | 2358399 C2 | 6/2009 |
| WO | WO 2008144927 A1 | 12/2008 |
| WO | WO 2010025659 A1 | 3/2010 |
| WO | WO 2010051232 A1 | 5/2010 |

OTHER PUBLICATIONS

1st Office Action in corresponding U.S. Appl. No. 13/967,016 (Jun. 12, 2015).

* cited by examiner ered to a link. After receiving the Path message, the sink node returns a Resv message (connection establishment request response message), and finally a label path is successfully established between the source node and the sink node.

METHOD, NODE DEVICE AND SYSTEM FOR ESTABLISHING LABEL SWITCHED PATH

CROSS-REFERENCE TO RELATED APPLICATIONS

This application is a continuation of U.S. patent application Ser. No. 13/967,016, filed on Aug. 14, 2013, which is a continuation of International Patent Application No. PCT/CN2012/071055, filed on Feb. 13, 2012, which claims priority to Chinese Patent Application No. 201110039536.0, filed on Feb. 17, 2011. The afore-mentioned patent applications are hereby incorporated by reference in their entireties.

FIELD

The present application relates to the field of communications technologies, and in particular, to a method, node device and system for establishing a label switched path.

BACKGROUND

In a packet transport network, as shown in FIG. 1, a procedure of establishing a label switched path is that, a source node sends a Path message (connection establishment request message) hop-by-hop to a sink node, where the Path message carries bandwidth request information. After receiving the bandwidth information, each intermediate node on the way completes reserving a bandwidth resource, and allocates the bandwidth resource to a link. After receiving the Path message, the sink node returns a Resv message (connection establishment request response message), and finally a label path is successfully established between the source node and the sink node.

With the development of communications technologies, the intermediate node in the packet transport network may be a fiber node, and may also be or a microwave node. One important characteristic of the microwave node is adaptive modulation, which may adjust a modulation manner of a transmit signal according to an external environment, so as to maintain a high link usability, that is, bandwidth of the microwave node is changeable, and has a maximum value and a minimum value. In the prior art, after receiving the Path message sent by the source node, the microwave node may reserve bandwidth for this Path request when the bandwidth is at the minimum value, so as to maintain the high link usability.

After analysis of the prior art, the inventor finds that the prior art has at least the following defects. Because the bandwidth of the microwave node changes in a range, if it is computed when the bandwidth is at the minimum value, the bandwidth resource may not be allocated in most cases, which is a waste of the bandwidth resource. Moreover, if the bandwidth information carried in the Path message is greater than the minimum bandwidth of a microwave link, the microwave node may refuse to establish the link, so that the label switched path cannot be established on this node. For example, minimum bandwidth of one microwave link is 50 Mbps and maximum bandwidth of it is 400 Mbps due to a reason of the adaptive modulation, and assume that the bandwidth request information carried in the Path message sent by an initiating end (source node) when establishing the label switched path is 60 Mbps, if the microwave node reserves the bandwidth information for the path request according to the minimum bandwidth resource of 50 Mbps, the path cannot be established, while in fact a large quantity of bandwidth resources are left idle.

SUMMARY

In order to enable maximum utilization of a bandwidth resource of an adaptive bandwidth link and ensure connection availability, embodiments of the disclosure provide a method, node device and system for establishing a label switched path. The technical solutions are as follows:

In one aspect, a method for advertising link bandwidth information is provided, including: sending a link state advertisement (LSA) message comprising bandwidth information of a link to a plurality of network nodes in a network, wherein the bandwidth information comprises a plurality of link bandwidths and availabilities corresponding to the plurality of link bandwidths respectively, wherein each availability is a time scale that the corresponding link bandwidth is ensured.

In another aspect, a method for computing a label switched path is provided, including: receiving a link state advertisement (LSA) message from a microwave node, wherein the LSA message comprises bandwidth information of a link, wherein the bandwidth information comprises a plurality of link bandwidths and availabilities corresponding to the plurality of link bandwidths respectively, where each availability is a time scale that the corresponding link bandwidth is ensured. The method further includes obtaining network topology information according to the LSA message, and calculating a label switching path (LSP) route based on the network topology information.

In another aspect, a node device is provided, including: a transmitter, configured to send a link state advertisement (LSA) message comprising bandwidth information of a link to a plurality of network nodes in a network, wherein the bandwidth information comprises a plurality of link bandwidths and availabilities corresponding to the plurality of link bandwidths respectively, wherein each availability is a time scale that the corresponding link bandwidth is ensured.

In another aspect, a route computing unit is further provided, including: a receiver, configured to receive a link state advertisement (LSA) message from a microwave node, wherein the LSA message comprises bandwidth information of a link, wherein the bandwidth information comprises a plurality of link bandwidths and availabilities corresponding to the plurality of link bandwidths respectively, where each availability is a time scale that the corresponding link bandwidth is ensured.

Beneficial effects of the embodiments of the disclosure are that: Corresponding bandwidth request information under different conditions is carried in the initiated connection establishment request message, so that the nodes on the label switched path may, according to their own characteristics, reserve bandwidth information. As such, maximum utilization of the bandwidth resource is enabled under a precondition that link availability is ensured.

BRIEF DESCRIPTION OF THE DRAWINGS

To illustrate the technical solutions of the embodiments of the disclosure or in the prior art more clearly, accompanying drawings that need to be used in the description of the embodiments or the prior art are briefly introduced below. Evidently, the accompanying drawings are merely some embodiments of the disclosure, and persons of ordinary skill in the art may obtain other accompanying drawings based on these accompanying drawings without making creative efforts.

DETAILED DESCRIPTION OF THE EMBODIMENTS

To make the objectives, technical solutions, and advantages of the present application more clear, the embodiments of the disclosure are described in further detail below with reference to the accompanying drawings.

Embodiment 1

Figure 1:
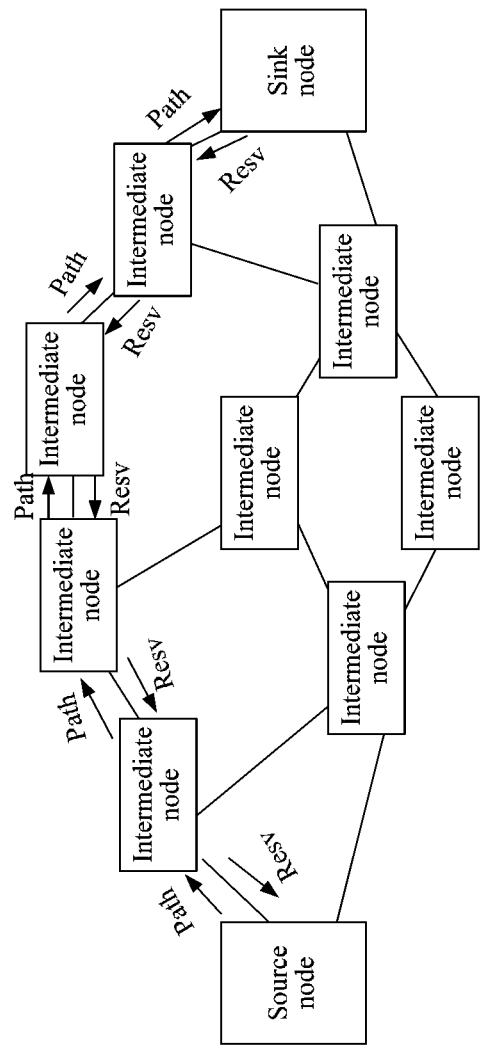
FIG. 1 is a flow chart of a message for establishing a label switched path in the prior art.
Figure 2:
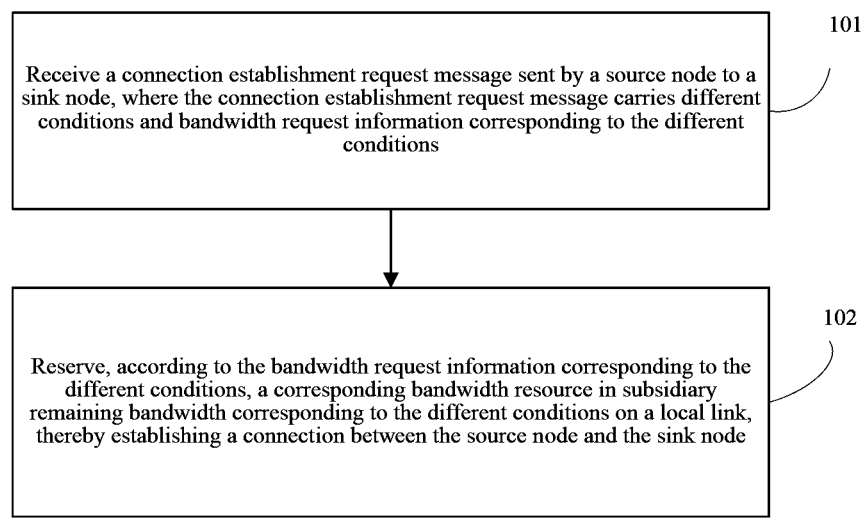
FIG. 2 is a flow chart of a method for establishing a label switched path according to Embodiment 1 of the disclosure.

Referring to FIG. 2, this embodiment of the disclosure provides a method for establishing a label switched path, including:

Step 101: Receive a connection establishment request message sent by a source node to a sink node, where the connection establishment request message carries corresponding bandwidth request information under different conditions, and each of the bandwidth request information corresponds to one condition; and Step 102: Reserve, according to the bandwidth request information corresponding to the different conditions, a corresponding bandwidth resource in remaining bandwidth corresponding to the different conditions on a local link, thereby establishing a connection between the source node and the sink node.

Further, in this embodiment, before the receiving the connection establishment request message sent by the source node to the sink node, the method further includes: sending a link state advertisement, so that a route computing unit is enabled to obtain network topology information according to the collected link state advertisement, obtain a connection route of a label switched path between the source node and the sink node through computing based on the topology information, and deliver the connection route of the label switched path to a signaling unit of the source node, where the link state advertisement carries link bandwidth under different conditions, and each of the link bandwidth corresponds to one condition.

In this embodiment, when the nodes on the label switched path are microwave nodes, the reserving, according to the bandwidth request information corresponding to the different conditions, the corresponding bandwidth resource in subsidiary remaining bandwidth corresponding to the different conditions on the local link, thereby establishing the connection between the source node and the sink node includes: judging whether a subsidiary bandwidth demand, which is obtained through computing, in the corresponding bandwidth request information under each of the different conditions is smaller than or equal to the remaining bandwidth under the corresponding condition on the local link. And if yes, reserving, under each condition, the subsidiary bandwidth demand in the corresponding bandwidth request information under each of the different conditions.

In this embodiment, before the judging whether the subsidiary bandwidth demand, which is obtained through computing, in the corresponding bandwidth request information under each of the different conditions is smaller than or equal to the remaining bandwidth under the corresponding condition on the local link, the method further includes: according to bandwidth requests corresponding to the different conditions, computing subsidiary bandwidth which needs to be reserved under each condition.

When the nodes on the label switched path are fiber nodes, the reserving, according to the bandwidth request information corresponding to the different conditions, the corresponding bandwidth resource in subsidiary remaining bandwidth corresponding to the different conditions on the local link, thereby establishing the connection between the source node and the sink node includes: obtaining maximum total bandwidth information carried in the connection establishment request message; judging whether maximum total bandwidth is smaller than or equal to the subsidiary remaining bandwidth on the local link; and if yes, reserving the maximum total bandwidth.

Further, the method for establishing the label switched path further includes: receiving a connection maintenance request message sent by the source node, where the connection maintenance request message carries an adjusted bandwidth requirement; and adjusting current bandwidth according to the adjusted bandwidth requirement.

The condition in this embodiment includes: an availability parameter, a priority level, or a case of a change of the bandwidth.

Beneficial effects of the embodiment of the disclosure are that: Corresponding bandwidth request information under different conditions is carried in the initiated connection establishment request message, so that the nodes on the label switched path may, according to their own characteristics, reserve bandwidth information. As such, maximum utilization of the bandwidth resource is enabled under a precondition that link availability is ensured.

Embodiment 2

Figure 3:
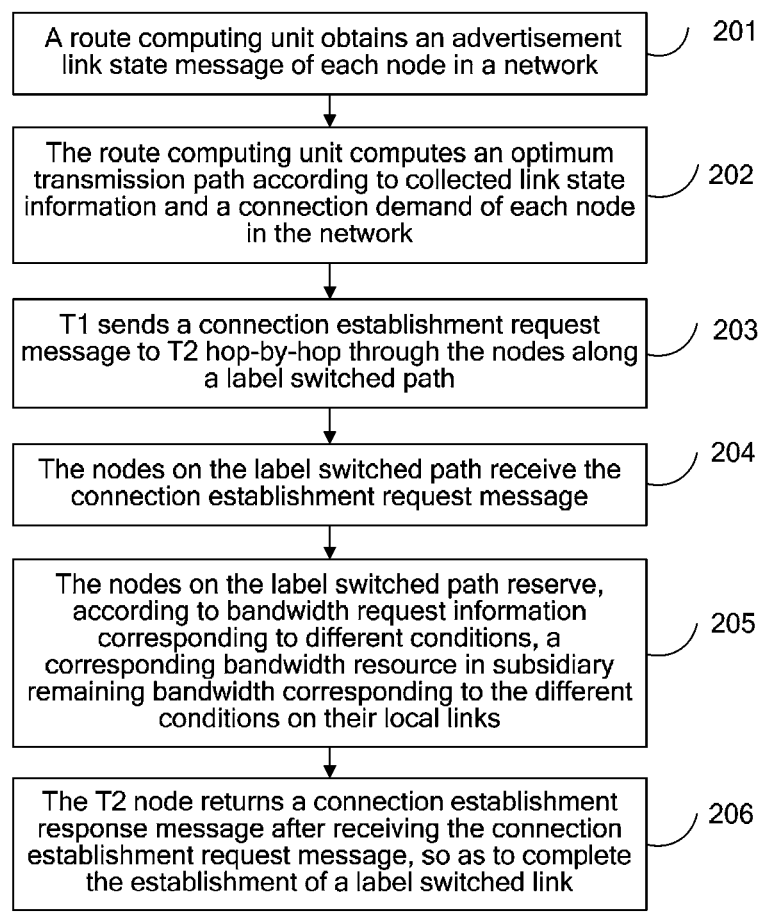
FIG. 3 is a flow chart of a method for establishing a label switched path according to Embodiment 2 of the disclosure.

Referring to FIG. 3, this embodiment of the disclosure provides a method for establishing a label switched path, including:

Step 201: A route computing unit obtains a link state advertisement message of each node in a network.

Figure 4:
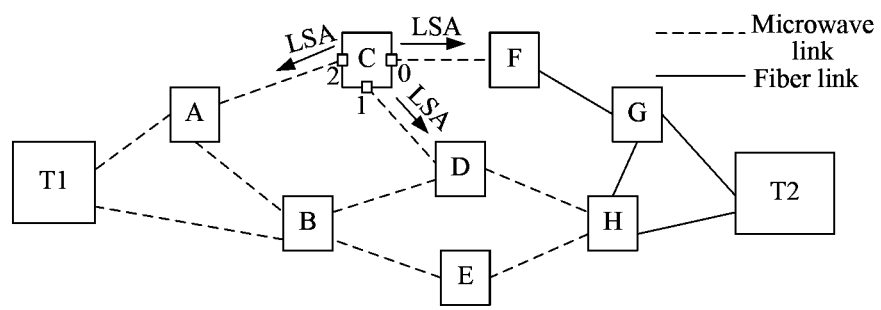
FIG. 4 is a diagram of an application scenario of establishing a label switched path according to Embodiment 2 of the disclosure.

An application scenario of this embodiment is as shown in FIG. 4. T1, T2 and A to H are nodes in a network, which are all packet devices, and they are connected through a fiber or microwave link, where a dotted line indicates the microwave link while a solid line indicates the fiber link. An operator hopes to establish a connection between T1 and T2 to implement bearing of a subsequent user service, then in this embodiment, a source node is T1, a sink node is T2, and A to H are intermediate nodes. The route computing unit may be on any node in the network or on a node outside the network.

Before a label switched path is established between T1 and T2, the route computing unit first collects information of each node on the link. Assume that the network adopts OSPF (open shortest path first) as a routing protocol, each node in the network advertises an LSA (link state advertisement) periodically, and in this way, each node in the network may receive all the LSA messages sent by all other nodes.

For a microwave node, bandwidth resources that the microwave link can provide are different due to external impacts (rain, fog, snow and so on). Each bandwidth resource has corresponding different conditions that can ensure it, and for the microwave node, the different conditions indicate a capability of different bandwidth resources that the microwave node can provide. In this embodiment, the different conditions may be limited by using different availability parameters, and an availability parameter uses a percentage to describe a time scale that the bandwidth resource is ensured. Take a node C in FIG. 4 as an example for illustration, and for a link of an interface 0, in 99.9% of the cases, it may be ensured to provide bandwidth of up to 800 Mbps, while in 0.1% of the cases, such high bandwidth may not be provided due to an impact of rain, snow and so on; and in 99.999% of the cases, it may be ensured to provide bandwidth of up to 100 Mbps, while in 0.001% of the cases, such high bandwidth may not be provided due to an impact of rain, snow, and so on.

In this embodiment, the microwave node sends the link state advertisement, which, compared with an existing LSA message, needs to carry a specific message of the microwave link, that is, carry link bandwidth information of the microwave node, where a plurality of link bandwidth is included, and each link bandwidth corresponds to one condition. Take the node C as an example, the node C advertises the LSA message in the network periodically, three links of the node C are all microwave links, and the LSA message includes content shown in Table 1:

TABLE 1

| LSA Header (link state advertisement header) Link State ID (link state ID) Advertising Router (advertising router) Link State Sequence Number (link state sequence number) | | | |
|---|---|---|---|
| Link_ID0 | | IF0_IP_address | |
| Availability1 (99.9%) | 200 Mbps | Availability2 (99.95%) | 200 Mbps |
| Availability3 (99.99%) | 300 Mbps | Availability4 (99.999%) | 100 Mbps |
| Link_ID1 | | IF1_IP_address | |
| Availability1 (99.9%) | 100 Mbps | Availability2 (99.95%) | 150 Mbps |
| Availability3 (99.99%) | 100 Mbps | Availability4 (99.999%) | 100 Mbps |
| Link_ID2 | | IF2_IP_address | |
| Availability1 (99.9%) | 100 Mbps | Availability2 (99.95%) | 150 Mbps |
| Availability3 (99.99%) | 100 Mbps | Availability4 (99.999%) | 100 Mbps |

As shown in Table 1, for each link, a plurality of bandwidth values are carried in the LSA message, and each indicates bandwidth that may be ensured under different availability cases. Link_ID0, Link_ID1 and Link_ID2 correspond to link identities on ports 0, 1 and 2 of the node C, respectively, and IP addresses corresponding to each port are IF0_IP_address, IF1_IP_address, IF2_IP_address and IF3_IP_address. Availability1, Availability2, Availability3 and Availability4 are different availability requirements. A bandwidth value corresponding to each availability requirement indicates a bandwidth amount that may be increased additionally in a case of the availability requirement as compared with an adjacent higher availability requirement. As shown in Table 1, for the link Link_ID0, the bandwidth value corresponding to Availability1 (99.9%) is 200 Mbps, which indicates that, as compared with the availability requirement of Availability2 (99.95%), a bandwidth resource of 200 Mbps may be further provided additionally. The bandwidth value corresponding to Availability4 (99.999%) is 100 Mbps, and since there is no availability requirement higher than Availability4, the total bandwidth which can be provided under this availability requirement is 100 Mbps. Therefore, the total bandwidth is 100+300+200+200=800 Mbps under the availability requirement being Availability1 (99.9%). Definitely, total bandwidth which can be provided under each availability requirement may be spread directly in the LSA message, as shown in Table 2, where there is only a difference in an expression manner, but the nature is the same.

TABLE 2

| LSA Header (link state advertisement header) Link State ID (link state ID) Advertising Router (advertising router) Link State Sequence Number (link state sequence number) | | | |
|---|---|---|---|
| Link_ID0 | | IF0_IP_address | |
| Availability1 (99.9%) | 800 Mbps | Availability2 (99.95%) | 600 Mbps |
| Availability3 (99.99%) | 400 Mbps | Availability4 (99.999%) | 200 Mbps |
| Link_ID1 | | IF1_IP_address | |
| Availability1 (99.9%) | 400 Mbps | Availability2 (99.95%) | 350 Mbps |
| Availability3 (99.99%) | 200 Mbps | Availability4 (99.999%) | 100 Mbps |
| Link_ID2 | | IF2_IP_address | |
| Availability1 (99.9%) | 400 Mbps | Availability2 (99.95%) | 350 Mbps |
| Availability3 (99.99%) | 200 Mbps | Availability4 (99.999%) | 100 Mbps |

Step 202: The route computing unit computes an optimum transmission path according to collected link state information and a connection demand of each node in the network.

The route computing unit receives the connection demand, where the connection demand requires to establish the connection between T1 and T2, and requires that total bandwidth of 250 Mbps under an availability requirement of 99.9% is provided, total bandwidth of 160 Mbps under an availability requirement of 99.95% is provided, total bandwidth of 80 Mbps under an availability requirement of 99.99% is provided, and total bandwidth of 30 Mbps under an availability requirement of 99.999% is provided. Generally, the connection demand is determined according to a service demand plan.

Figure 5:
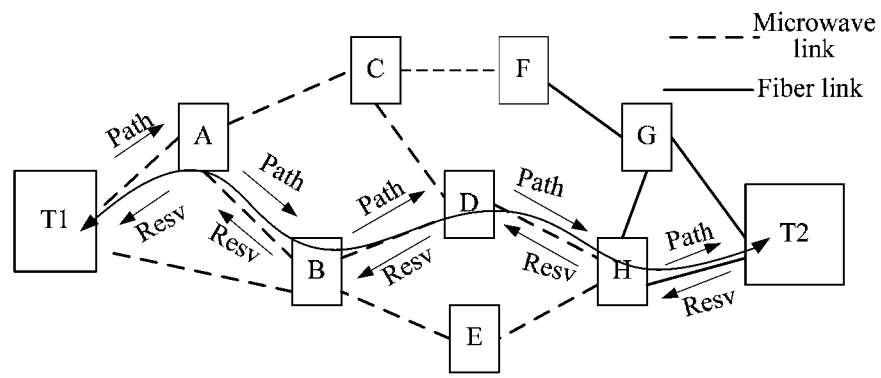
FIG. 5 is a diagram of an application scenario of establishing a label switched path according to Embodiment 2 of the disclosure.

The route computing unit computes network topology according to the collected link state information, and computes the optimum path to T2 according to the topology and the link resource information in combination with the foregoing connection request as a constraint condition, and delivers a route computing result to a signaling unit of the signaling source node T1. As shown in FIG. 5, here the optimum path is assumed to be T1-A-B-D-H-T2. That the route computing unit computes the transmission path according to the link state information belongs to the prior art, which is not repeatedly described here in this embodiment.

Step 203: T1 sends a connection establishment request message to T2 through the nodes along the label switched path.

In this embodiment, the connection establishment request message is a Path message of an RSVP-TE (resource reservation-traffic engineering) protocol, and it is transmitted hop-by-hop along A-B-D-H to T2, requiring the label switched path be established with T2. A plurality of bandwidth request information is carried in the connection establishment request message, where the bandwidth request information includes different conditions and bandwidth request information corresponding to the different conditions. The bandwidth information needed under the different conditions is generally determined according to the service demand plan, and matches the different conditions that the microwave link can satisfy. The different conditions in the Path message shown in Table 3 are indicated by different availability parameters:

TABLE 3

| |
|---|
| Sender_TSpec1 (Availability1 (99.9%), 250 Mbps) |
| Sender_TSpec2 (Availability2 (99.95%), 160 Mbps) |
| Sender_TSpec3 (Availability3 (99.99%), 80 Mbps) |
| Sender_TSpec4 (Availability4 (99.999%), 30 Mbps) |

As described in Table 3, a plurality of Sender_TSpec objects is carried in the Path message. Each Sender_TSpec is a traffic parameter object, describing a specific bandwidth request. Availability, which the requested bandwidth needs to satisfy, and a corresponding bandwidth value under the availability requirement are included in each Sender_TSpec object. An availability indicator here matches an availability indicator in Table 1, for example, both include availability indicators of 99.9%, 99.95%, 99.99%, and 99.999%. Total bandwidth of 250 Mbps may be ensured in the case that the bandwidth resource which is required to be allocated in the connection request message is 99.9%, total bandwidth of 160 Mbps may be ensured in the case of 99.95%, total bandwidth of 80 Mbps may be ensured in the case of 99.99%, and total bandwidth of 30 Mbps may be ensured in the case of 99.999%. Different availability requirements and corresponding bandwidth requests are added into the connection establishment request message, so that the microwave node reserves, according to its own characteristic, corresponding bandwidth information according to the different availability requirements, so as to enable maximum utilization of the whole link bandwidth resources while ensuring the availability of the connection.

TABLE 4

| |
|---|
| Sender_TSpec1 (Availability1 (99.9%), 90 Mbps) |
| Sender_TSpec2 (Availability2 (99.95%), 80 Mbps) |
| Sender_TSpec3 (Availability3 (99.99%), 50 Mbps) |
| Sender_TSpec4 (Availability4 (99.999%), 30 Mbps) |

Definitely, as shown in Table 4, the Path message may directly carry a subsidiary bandwidth value corresponding to each availability indicator, that is, only a service bandwidth quota corresponding to a requirement of the availability indicator can be provided, rather than a total bandwidth value corresponding to each availability indicator. For example, the Sender_TSpec1 (Availability1 (99.9%), 90 Mbps) in Table 4 indicates that the subsidiary bandwidth value corresponding to the availability requirement of 99.9% is 90 Mbps, and this part of bandwidth can only be allocated to a service whose availability requirement is 99.9% or lower. Because subsidiary bandwidth corresponding to a high availability requirement may be allocated to a service having a low availability requirement, a total bandwidth value which can be provided under the availability requirement of 99.9% is 90+80+50+30=250 Mbps.

It should be noted that, Table 3 and Table 4 are actually different expression manners of the same bandwidth request information, and this embodiment still uses the expression manner of Table 3 subsequently.

In this embodiment, the different conditions may be replaced by a priority level or a case of a change of the bandwidth, which is not specifically limited in this embodiment here. If taking the change of the bandwidth as an example, assume that various cases of the change of the bandwidth are indexed by c1, c2, cn, then accordingly, a modification of the LSA message may be as in Table 5:

TABLE 5

| LSA Header | | | |
|---|---|---|---|
| Link State ID | | | |
| Advertising Router | | | |
| Link State Sequence Number | | | |
| Link_ID0 | | IF0_IP_address | |
| c1 | 200 Mbps | c2 | 200 Mbps |
| c3 | 300 Mbps | c4 | 100 Mbps |
| Link_ID1 | | IF1_IP_address | |
| c1 | 100 Mbps | c2 | 150 Mbps |
| c2 | 100 Mbps | c4 | 100 Mbps |
| Link_ID2 | | IF2_IP_address | |
| c1 | 100 Mbps | c2 | 150 Mbps |
| c3 | 100 Mbps | c4 | 100 Mbps |

A corresponding Path message may be modified as shown in Table 6:

TABLE 6

| |
|---|
| Sender_TSpec1 (c1, 250 Mbps) |
| Sender_TSpec2 (c2, 160 Mbps) |
| Sender_TSpec3 (c3, 80 Mbps) |
| Sender_TSpec4 (c4, 30 Mbps) |

Step 204: The nodes on the label switched path receive the connection establishment request message.

Each node in the link from T1 to T2 receives the connection establishment request message sent by T1, and reserves corresponding bandwidth, where the node on the label switched path includes a source node, an intermediate node, and a sink node. In a special case, there may be a case that only the source node and the sink node exist on the label switched path, which is not specifically limited in this embodiment.

Step 205: The nodes on the label switched path reserve, according to the bandwidth request information corresponding to the different conditions, corresponding bandwidth resources in subsidiary remaining bandwidth corresponding to the different conditions on their local links.

In this embodiment, the nodes from T1 to T2 include the microwave nodes (A, B, and D) and the fiber node (H). After receiving the connection establishment request message, the microwave nodes compare the corresponding bandwidth request under each availability requirement carried in it with the remaining bandwidth under the corresponding availability requirement on their local links. The comparison is made in order to judge whether the remaining bandwidth under the corresponding availability requirement on their local links satisfies the bandwidth request under each availability requirement. If satisfied, continue the path establishing procedure and configure bandwidth reserving information on the nodes. In the connection establishment request message received by the node B as shown in Table 2, bandwidth of 250 Mbps may be ensured in the case that the bandwidth resource, which is required to be allocated, is 99.9%, bandwidth of 160 Mbps may be ensured in the case of 99.95%, bandwidth of 80 Mbps may be ensured in the case of 99.99%, and bandwidth of 30 Mbps may be ensured in the case of 99.999%. Table 6 is a table of remaining bandwidth quotas maintained by the node B, where each entry describes the amount of the subsidiary remaining bandwidth which can be ensured under each of the different availability requirements. Table 7 indicates that the subsidiary remaining bandwidth, which can be ensured to obtain under the availability of 99.9%, is 300 Mbps; the subsidiary remaining bandwidth, which can be ensured to obtain under the availability of 99.95%, is 100 Mbps; the subsidiary remaining bandwidth, which can be ensured to obtain under the availability of 99.99%, is 100 Mbps; and the subsidiary remaining bandwidth, which can be ensured to obtain under the availability of 99.999%, is 100 Mbps.

TABLE 7

| Availability | Subsidiary remaining bandwidth (Mbps) |
| --- | --- |
| 99.9% | 300 |
| 99.95% | 100 |
| 99.99% | 100 |
| 99.999% | 100 |

Because subsidiary bandwidth of high availability is always usable in a case that subsidiary bandwidth of low availability is usable, total bandwidth, which can be provided under a low availability condition, is a sum of the subsidiary remaining bandwidth under the low availability condition and the subsidiary remaining bandwidth corresponding to all the high availability. Therefore, bandwidth requests that the node B may ensure under different availability requirements, that is, a bandwidth request of 600 Mbps that may be ensured in the case of 99.9%, a bandwidth request of 300 Mbps that may be ensured in the case of 99.95%, a bandwidth request of 200 Mbps that may be ensured in the case of 99.99%, and a bandwidth request of 100 Mbps that may be ensured in the case of 99.999%, may be obtained through computing according to Table 6. If judging that the remaining bandwidth can satisfy the bandwidth request carried in the connection establishment request message in the cases of different availability, the node B reserves corresponding requested bandwidth information for the request. A specific procedure is as follows:

(1) According to the bandwidth requests corresponding to the different conditions, compute the bandwidth, which needs to be reserved under each condition In this embodiment, the number of subsidiary bandwidth requests, which are needed and correspond to different availability, is computed according to the bandwidth request, and the specific computing method is that, because the total bandwidth which can be provided by the microwave node under the low availability condition is the sum of the remaining bandwidth under the low availability and the remaining bandwidth corresponding to all the high availability, the subsidiary bandwidth which needs to be reserved under each condition is obtained by subtracting a bandwidth request, which corresponds to a high condition of a next level of each condition, from the bandwidth request, which corresponds to each condition in the different conditions. As in Table 8, under the condition of the availability of 99.9%, needed subsidiary bandwidth is: the corresponding bandwidth under the condition of 99.9% minus the corresponding bandwidth under the condition of 99.95%, that is, 250−160=90 Mbps, and by analogy, computing results obtained are as shown in Table 8.

TABLE 8

| Availability | Subsidiary bandwidth demand (Mbps) |
| --- | --- |
| 99.9% | 90 |
| 99.95% | 80 |
| 99.99% | 50 |
| 99.999% | 30 |

In addition, it should be noted that, this step of computing is not needed when the Sender_TSpec object of the bandwidth request information directly carries the subsidiary bandwidth demand which corresponds to the availability directly under the different availability, rather than the total bandwidth under the different availability requirements.

(2) Compare to see whether the subsidiary remaining bandwidth under each availability condition satisfies the subsidiary bandwidth demand. If the subsidiary remaining bandwidth is greater than or equal to the subsidiary bandwidth demand under each availability condition, the bandwidth request is satisfied. In this embodiment, compare the subsidiary bandwidth demand corresponding to each availability in Table 8 with the corresponding subsidiary remaining bandwidth in Table 7 under the same availability as in Table 8. That is, compare the corresponding subsidiary bandwidth demand under 99.9%, 99.95%, 99.99%, and 99.999% in Table 8 with the corresponding subsidiary remaining bandwidth in Table 7, respectively, and if the remaining bandwidth in Table 7 satisfies the demand in Table 8, the establishment of the label switched path is continued.

In addition, it should be noted that, if the subsidiary bandwidth demand of low availability is not satisfied in this embodiment, under a certain policy, the subsidiary remaining bandwidth of high availability may be borrowed to satisfy the demand, while the reverse is not so. In this embodiment, under a certain policy, it may also not be allowed to use the subsidiary remaining bandwidth of high availability to satisfy the subsidiary bandwidth demand of low availability, which is not specifically limited in this embodiment. If the bandwidth request cannot be fully satisfied, an error message PathErr is returned.

If an availability condition carried in the connection establishment request does not match an availability condition in the microwave node, subsidiary remaining bandwidth corresponding to minimum availability which is higher than the availability condition carried in the connection establishment request is used for allocation. That is, if an availability condition of 99.98% appears, while as shown in Table 7, there is no such availability condition, the requested bandwidth of 99.98% is compared with the remaining bandwidth of 99.99% in Table 7, that is, according to a principle that the subsidiary bandwidth request of low availability may be satisfied by using the subsidiary remaining bandwidth of high availability.

(3) Perform bandwidth reservation and update the remaining bandwidth quota table, that is, subtract the allocated bandwidth from the current remaining bandwidth. Table 9 indicates an updated remaining bandwidth quota table.

TABLE 9

| Availability | Subsidiary remaining bandwidth (Mbps) |
|---|---|
| 99.9% | 210 |
| 99.95% | 20 |
| 99.99% | 50 |
| 99.999% | 70 |

In this embodiment, the node B reserves corresponding bandwidth for the label switched path according to the bandwidth demand in Table 8, where corresponding bandwidth is reserved under each condition, and total bandwidth which a lower level of condition can ensure is a sum of reserved bandwidth under this level of condition and reserved bandwidth under all the higher levels of conditions.

In this embodiment, after the fiber node receives the connection establishment request message, since the fiber node belongs to a fixed bandwidth medium and is not affected by the weather, in order to ensure the bandwidth resource requirement of the connection, the fiber node obtains maximum total bandwidth request information corresponding to the condition carried in the connection establishment request message, and judge whether the maximum total bandwidth request is smaller than or equal to the remaining bandwidth of the local link, and if yes, reserve the maximum bandwidth information for the link. For example, the maximum total bandwidth request in the connection establishment request message is 250 Mbps, and bandwidth information of 250 Mbps is reserved for the link.

Step 206: The T2 node returns a connection establishment response message after receiving the connection establishment request message, so as to complete the establishment of the label switched link.

In this embodiment, the connection establishment is completed after all the nodes finish processing the connection establishment response message.

In this embodiment, after the label switched path is established successfully, a current bandwidth working mode is carried in the Path message by carrying a current activated Sender_TSpec sequence number in the message or by setting an activated identifier in the Sender_TSpec object. In this way, after one microwave link adjusts the bandwidth when being affected by the external environment, the microwave link notifies the state to the source node, and after receiving the notification, the source node carries the adjusted bandwidth information in the Path message which is sent subsequently, so that each node adjusts current bandwidth according to the adjusted bandwidth information, and reserves the bandwidth for the link again, thereby more effective utilizing the link bandwidth resource. For convenience of understanding of persons skilled in the art, an example is given as follows:

TABLE 10

Sender_TSpec1 (Availability1 (99.9%), 250 Mbps)
Sender_TSpec2 (Availability2 (99.95%), 160 Mbps)
Sender_TSpec3 (Availability3 (99.99%), 80 Mbps)
Sender_TSpec4 (Availability4 (99.999%), 30 Mbps)
Active_Sender_Tspec(Sender_TSpec1)

(1) Carry an Active_Sender_TSpec object in the Path message to indicate the current bandwidth information. As shown in Table 10, in a normal state, when the Active_Sender_TSpec object indicates Sender_TSpec1 as an activated object, it indicates that the current state is that the LSP occupies bandwidth of 250 Mbps.

TABLE 11

Sender_TSpec1 (Availability1 (99.9%), 250 Mbps)
Sender_TSpec2 (Availability2 (99.95%), 160 Mbps)
Sender_TSpec3 (Availability3 (99.99%), 80 Mbps)
Sender_TSpec4 (Availability4 (99.999%), 30 Mbps)
Active_Sender_Tspec(Sender_TSpec3)

(2) When one microwave link is affected by the external environment, and only A bandwidth resource under the availability of 99.99% can be ensured, the microwave node notifies the state to the source node T1 node, and the T1 node uses the Active_Sender_TSpec object to indicate the Sender_TSpec3 as an activated object in the Path message which is sent subsequently, as shown in Table 11, which indicates that currently the LSP bandwidth is reduced to 80 Mbps.

(3) The nodes on the label switched path receive the Path message, and learn that at p resent, the LSP bandwidth is reduced to 80 Mbps, so that the additional bandwidth of 170 Mbps may be shared by other services.

Beneficial effects of the technical solution in the embodiment of the disclosure are that: Different conditions and corresponding bandwidth request information under the different conditions are carried in the initiated connection establishment request message, so that the nodes on the label switched path may reserve bandwidth information according to their own characteristics, and as a result, maximum utilization of the bandwidth resource is enabled under a precondition that the link availability is ensured.

Embodiment 3

Figure 6:
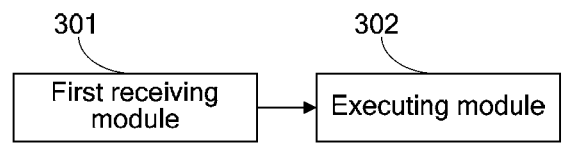
FIG. 6 is a schematic structural diagram of a node device according to Embodiment 3 of the disclosure.

Referring to FIG. 6, this embodiment of the disclosure provides a node device, including a first receiving module 301 and an executing module 302.

The first receiving module 301 is configured to receive a connection establishment request message sent by a source node to a sink node, where the connection establishment request message carries bandwidth request information corresponding to different conditions, and each of the bandwidth request information corresponds to one condition.

The executing module 302 is configured to reserve, according to the bandwidth request information corresponding to the different conditions, a corresponding bandwidth resource in subsidiary remaining bandwidth corresponding to the different conditions on a local link, thereby establishing a connection between the source node and the sink node.

Figure 7:
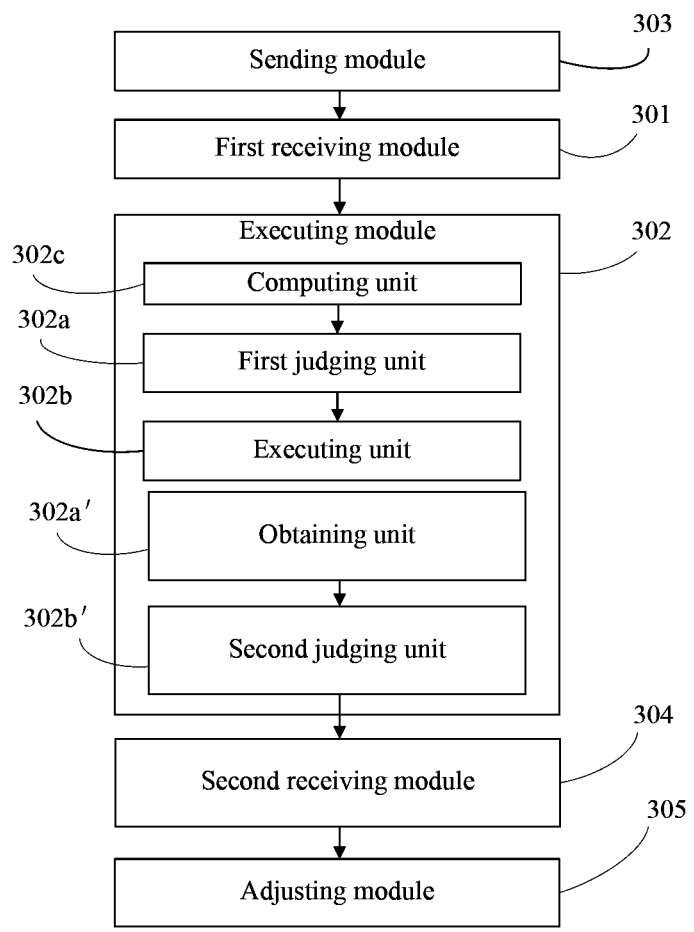
FIG. 7 is a schematic structural diagram of another node device according to Embodiment 3 of the disclosure.

Referring to FIG. 7, further in this embodiment, the node device further includes: a sending module 303, configured to send a link state advertisement before the connection establishment request message sent by the source node to the sink node is received, so that a route computing unit is enabled to obtain network topology information according to the collected link state advertisement, obtain, through computing based on the topology information, a connection route of a label switched path between the source node and the sink node, and deliver the connection route of the label switched path to a signaling unit of the source node, where the link state advertisement carries link bandwidth under different conditions, and each of the link bandwidth corresponds to one condition.

Referring to FIG. 7, when the node device on the label switched path is a microwave node device, the executing module 302 includes the following. A first judging unit 302a, configured to judge whether a subsidiary bandwidth demand in the corresponding bandwidth request information under each of the different conditions is smaller than or equal to the subsidiary remaining bandwidth under the corresponding condition on the local link. An executing unit 302b, configured to, if the first judging unit judges that the subsidiary bandwidth demand in the corresponding bandwidth request information under each of the different conditions is smaller than or equal to the subsidiary remaining bandwidth under the corresponding condition on the local link, reserve, under each condition, the subsidiary bandwidth demand in the corresponding bandwidth request information under each of the different conditions.

Furthermore, in this embodiment, the executing module further includes a computing unit 302c, configured to, before the first judging unit 302a performs judgment, compute, according to bandwidth requests corresponding to the different conditions, subsidiary bandwidth, which needs to be reserved under each condition.

Referring to FIG. 7, in this embodiment, when the node device on the label switched path is a fiber node device, the executing module 302 includes an obtaining unit 302a', configured to obtain maximum total bandwidth information carried in the connection establishment request message; and a second judging unit 302b', configured to judge whether the maximum total bandwidth is smaller than or equal to the subsidiary remaining bandwidth on the local link; and if yes, reserve the maximum total bandwidth.

Referring to FIG. 7, further, the device in this embodiment further includes a second receiving module 304, configured to receive a connection maintenance request message sent by the source node, where the connection maintenance request message carries an adjusted bandwidth requirement; and an adjusting module 305, configured to adjust current bandwidth according to the adjusted bandwidth requirement.

The condition in this embodiment includes: an availability parameter, a priority level, or a case of a change of the bandwidth.

Figure 8:
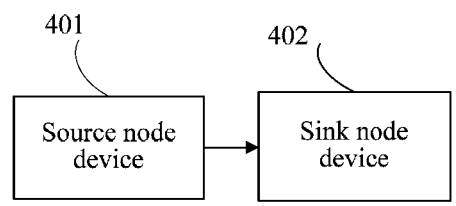
FIG. 8 is a schematic diagram of a system for establishing a label switched path according to Embodiment 3 of the disclosure.

Referring to FIG. 8, the embodiment of the disclosure provides a system for establishing a label switched path, including: a source node device 401 and a sink node device 402.

The source node device 401 is configured to send a connection establishment request message along a label switched path to the sink node, where the connection establishment request message carries bandwidth request information corresponding to different conditions, and each of the bandwidth request information corresponds to one condition.

The sink node device 402 is configured to receive the connection establishment request message sent by the source node device, reserve, according to the bandwidth request information corresponding to the different conditions, a corresponding bandwidth resource in remaining bandwidth corresponding to the different conditions on a local link, and return a connection establishment response message through an intermediate node device along the label switched path, thereby establishing a connection between the source node device and the sink node device.

Figure 9:
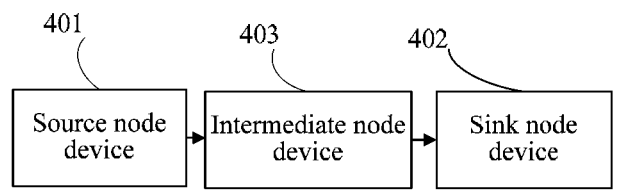
FIG. 9 is a schematic diagram of another system for establishing a label switched path according to Embodiment 3 of the disclosure.

Referring to FIG. 9, further, in this embodiment, the system further includes an intermediate node device 403, configured to receive the connection establishment request message sent by the source node device to the sink node device, and reserve, according to the bandwidth request information corresponding to the different conditions, a corresponding bandwidth resource in remaining bandwidth corresponding to the different conditions on a local link.

Further, in this embodiment, the source node device 401 is further configured to, before sending the connection establishment request message along the label switched path, reserve, according to the bandwidth request information corresponding to the different conditions, a corresponding bandwidth resource in remaining bandwidth corresponding to the different conditions on a local link.

In this embodiment, when the source node device 401, the intermediate node device 403 and the sink node device 402 are microwave node devices, the source node device 401, the intermediate node device 403 and the sink node device 402 are further configured to send a link state advertisement before the connection establishment request message sent by the source node device to the sink node device is received. So that a route computing unit is enabled to obtain network topology information according to the collected link state advertisement, obtain, through computing based on the topology information, a connection route of the label switched path between the source node and the sink node, and deliver the connection route of the label switched path to a signaling unit of the source node, where the link state advertisement carries link bandwidth under different conditions, and each of the link bandwidth corresponds to one condition.

When the source node device 401, the intermediate node device 403 and the sink node device 402 are microwave node devices, the reserving, according to the bandwidth request information corresponding to the different conditions, the corresponding bandwidth resources in the subsidiary remaining bandwidth corresponding to the different conditions on their local links includes judging whether a subsidiary bandwidth demand in the corresponding bandwidth request information under each of the different conditions is smaller than or equal to the subsidiary remaining bandwidth under the corresponding condition on the local link. If yes, reserving, under each condition, the subsidiary bandwidth demand in the corresponding bandwidth request information under each of the different conditions.

In this embodiment, when the source node device 401, the intermediate node device 403 and the sink node device 402 are fiber node devices, the reserving, according to the bandwidth request information corresponding to the different conditions, the corresponding bandwidth resources in the subsidiary remaining bandwidth corresponding to the different conditions on their local links includes obtaining maximum total bandwidth information carried in the connection establishment request message. Then judging whether the maximum total bandwidth is smaller than or equal to the subsidiary remaining bandwidth on the local link; and if yes, reserving the maximum total bandwidth.

Beneficial effects of the embodiment of the disclosure are that: Corresponding bandwidth request information under different conditions is carried in the initiated connection establishment request message, so that the nodes on the label switched path may reserve bandwidth information according to their own characteristics, and that maximum utilization of the bandwidth resource is enabled under a precondition that link availability is ensured.

The node device and the system provided in this embodiment may belong to a same concept of the method embodiment, and reference may be made to the method embodiment for the specific implementation manner, which is not repeatedly described here.

All or part of the foregoing technical solutions provided in the embodiments of the disclosure may be implemented by a program instructing relevant hardware. The program may be stored in a readable storage medium, and the storage medium include various media that may store program codes, such as a read only memory (ROM), a random access memory (RAM), a magnetic disk, a compact disk, and so on.

The foregoing descriptions are merely exemplary embodiments of the disclosure, but are not intended to limit the present application. Any modification, equivalent replacement, or improvement made without departing from the spirit and principle of the disclosure shall fall within the protection scope of the present application.

What is claimed is:

1. A method for advertising link bandwidth information, the method comprising:
    sending a link state advertisement (LSA) message comprising bandwidth information of a link to a plurality of network nodes in a network, wherein the bandwidth information comprises a plurality of link bandwidths, and availabilities corresponding to the plurality of link bandwidths, respectively, wherein each availability is a time scale that a corresponding link bandwidth is ensured.

2. The method according to claim 1, wherein after sending the LSA message, the method further comprises:
    receiving a Path message sent by a source node to a sink node, wherein the Path message carries bandwidth request information including a plurality of availability parameters and a plurality of requested bandwidths under the plurality of availability parameters respectively, wherein each of the plurality of availability parameters is a time scale that the corresponding requested bandwidth is ensured;
    reserving the plurality of requested bandwidths if each of the plurality of requested bandwidths can be ensured by a remaining bandwidth.

3. A method for computing a label switched path, the method comprising:
    receiving a link state advertisement (LSA) message from a microwave node, wherein the LSA message comprises bandwidth information of a link, wherein the bandwidth information comprises a plurality of link bandwidths, and availabilities corresponding to the plurality of link bandwidths, respectively, where each availability is a time scale that a corresponding link bandwidth is ensured;
    obtaining network topology information according to the LSA message; and
    calculating a label switching path (LSP) route based on the network topology information.

4. A node device comprising:
    a receiver configured to receive a connection establishment request message sent by a source node to a sink node, wherein the connection establishment request message includes bandwidth request information; and
    a transmitter, configured to send a link state advertisement (LSA) message comprising bandwidth information of a link to a plurality of network nodes in a network, wherein the bandwidth information comprises a plurality of link bandwidths, and availabilities corresponding to the plurality of link bandwidths, respectively, wherein each availability is a time scale that a corresponding link bandwidth is ensured.

5. The device according to claim 4, further comprising:
    a processor coupled to the receiver and the transmitter, configured to compare each of the plurality of requested bandwidths with a respective remaining bandwidth under the availability parameter corresponding to the requested bandwidth; and reserve the plurality of requested bandwidths if each of the plurality of requested bandwidths is smaller than or equal to the respective remaining bandwidth.

6. The device according to claim 4, wherein the processor is further configured to:
    reserve the plurality of requested bandwidths if each of the plurality of requested bandwidths can be ensured by a remaining bandwidth.

7. A route computing unit comprising:
    a receiver, configured to receive a link state advertisement (LSA) message from a microwave node, wherein the LSA message comprises bandwidth information of a link, wherein the bandwidth information comprises a plurality of link bandwidths, and availabilities corresponding to the plurality of link bandwidths, respectively, where each availability is a time scale that a corresponding link bandwidth is ensured; and
    a processor coupled to the receiver, configured to obtain network topology information according to the LSA message; and calculate a label switching path (LSP) route based on the network topology information.

* * * * *